United States Patent
Heine et al.

[11] 3,866,105
[45] Feb. 11, 1975

[54] BATTERY-RECHARGING DEVICE FOR INDICATING LAMP

[75] Inventors: Helmut A. Heine, Upper Barvia, Germany; Irving A. Speelman, Roslyn Heights, N.Y.; Otto H. Schmidt, Herrsching Upper Barvia, Germany

[73] Assignees: Optotechnik Heine KG, Germany; Propper Manufacturing Company, Inc., Long Island City, N.Y.

[22] Filed: Apr. 13, 1973

[21] Appl. No.: 351,049

[52] U.S. Cl. .................................. 320/48, 320/2
[51] Int. Cl. .................................. H02j 13/00
[58] Field of Search ............... 320/48, 2–5, 320/39, 40

[56] References Cited
UNITED STATES PATENTS
3,157,870  11/1964  Marino et al. ............... 320/48 X
3,275,919  9/1966  Decker et al. ............... 320/2

FOREIGN PATENTS OR APPLICATIONS
1,237,125  6/1971  Great Britain ............... 320/48 X
953,614  3/1964  Great Britain ............... 320/48

Primary Examiner—J. D. Miller
Assistant Examiner—Robert J. Hickey
Attorney, Agent, or Firm—Blum, Moscovitz, Friedman & Kaplan

[57] ABSTRACT

The device includes a support for receiving an electrical instrument powered by a rechargeable battery and arranged to automatically establish electrical contact with opposite terminals of the battery upon insertion of the instrument into the support. A DC potential is applied to the battery terminals through the medium of a transformer connected to a conventional commercial outlet and a rectifier connected to the secondary winding of the transformer. A transistor has its base connected to one terminal of the rectifier through resistance means, and its output circuit, comprising its emitter-collector circuit, is connected across the two terminals of the rectifier. A light-emitting indicator is connected in the output circuit of the transistor. The transistor may be an NPN transistor having its base connected to the negative terminal of the rectifier through suitable resistance means and its emitter directly connected to such negative terminal, with the collector of the transistor being connected to the indicator and the indicator being connected to the positive terminal of the rectifier through a current-limiting resistor.

7 Claims, 2 Drawing Figures

PATENTED FEB 1 1 1975  3,866,105

BATTERY-RECHARGING DEVICE FOR INDICATING LAMP

BACKGROUND OF THE INVENTION

Various types of electrical instruments and appliances are powered by rechargeable batteries, such as, for example, hermetically sealed nickel-cadmium battery cells which have almost unlimited life provided they are properly charged and recharged. Some of these appliances and instruments, such as, for example, electric toothbrushes and medical examination instruments such as otoscopes, are arranged to be substantially automatically recharged by replacing the appliance or instrument, after use, in a suitable support or holder which connects the rechargeable batteries to a source of DC potential, usually a rectifier connected to the secondary of a transformer whose primary may be connected to a convenience outlet by a suitable appliance cord. Some of these supports or charging devices are provided with indicating lamps in series with the battery when the latter is placed in the source to indicate the flow of charging current to the battery.

It is known that when nickel-cadmium batteries are discharged below a predetermined level, they cannot be recharged and must be discarded. In other words, they will not accept a recharging current and this is indicated by failure of the indicating lamp to be illuminated. There is a problem, however, in that these indicating lamps frequently burn out and thus are not illuminated even though the battery has not been discharged below its limiting level. If the burned-out lamp is connected in series with the battery, the charging current to the battery is automatically interrupted, but in any event, it is not possible to tell, when a lamp remains nonilluminated, whether the battery has been discharged below its limiting level or whether the lamp has burned out.

SUMMARY OF THE INVENTION

This invention relates to battery-recharging devices with light-emitting indicators, such as lamps, and more particularly, to a novel and improved battery-recharging device with an indicator which is not connected in series in the battery-charging circuit and which is connected with an energizing circuit therefor providing a flow of lamp current below the rated lamp current but sufficient to effect illumination of the lamp when a charging current is flowing through a battery.

More particularly, the charging circuit of the battery-recharging device of the present invention includes a holder for the appliance or instrument to be recharged and which is effective, when the appliance or instrument is inserted thereinto, to automatically connect the opposite terminals of the battery to opposite polarity terminals of a rectifier having input terminals connected to the secondary winding of a transformer whose primary winding may be connected, through a suitable cord and plug, to a conventional convenience outlet. A first resistor is connected between one rectifier output terminal and the support, and a second resistor connects a junction point between the first resistor and the support to the base of a transistor. The transistor has output electrodes including a collector and an emitter, and one of these output electrodes is connected to that terminal of the rectifier to which the first resistor is connected. The other transistor output terminal is connected in series with a lamp and a current-limiting third resistor to the other output terminal of the rectifier.

When the support does not have an appliance or instrument positioned therein, no charging current will flow through the first resistor, and hence, the second resistor, which serves as a protective resistor for limiting the base current of the transistor, does not supply a bias to the base of the transistor, so that the transistor remains nonconductive and the lamp is not illuminated. When a battery or an appliance or instrument containing a rechargeable battery is inserted into the support, a charging current flows through the rechargeable battery and thus through the first resistor. As a result, the voltage between the base of the transistor and its emitter increases from zero to a value sufficient to provide a flow of bias current to the base of the transistor, the bias current being limited by the second resistor. As the transistor becomes conductive, current flows through its output circuit and the indicating lamp is illuminated. The third resistor limits the flow of current through the lamp to a value somewhat below the rated current flow through the lamp but a value sufficient to effect illumination of the lamp.

The transistor may be in NPN transistor having its emitter connected to the negative terminal of the rectifier, to which negative terminal one end of the first resistor is also connected. The collector of the transistor is connected to the lamp and the lamp is connected, in series with the third resistor, to the positive terminal of the rectifier. However, other solid-state switch means may be used in place of such a transistor.

An object of the invention is to provide an improved recharging device, for rechargeable batteries, having a light-emitting indicator, such as a lamp.

Another object of the invention is to provide such a battery-recharging device in which the indicating lamp is not connected in series in the battery-charging circuit.

A further object of the invention is to provide such a battery-recharging device in which the energization of the indicating lamp is controlled through a transistor having its base connected to the battery-charging circuit.

Yet another object of the invention is to provide such a battery-recharging device including means limiting the flow of current through the lamp to a value below its rated value but sufficiently high to effect illumination of the lamp.

Still other objects and advantages of the invention will in part be obvious and will in part be apparent from the specification.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawing, in which.

DESCRIPTION OF THE PREFERRED EMBODIMENT

Figures 1, 2:
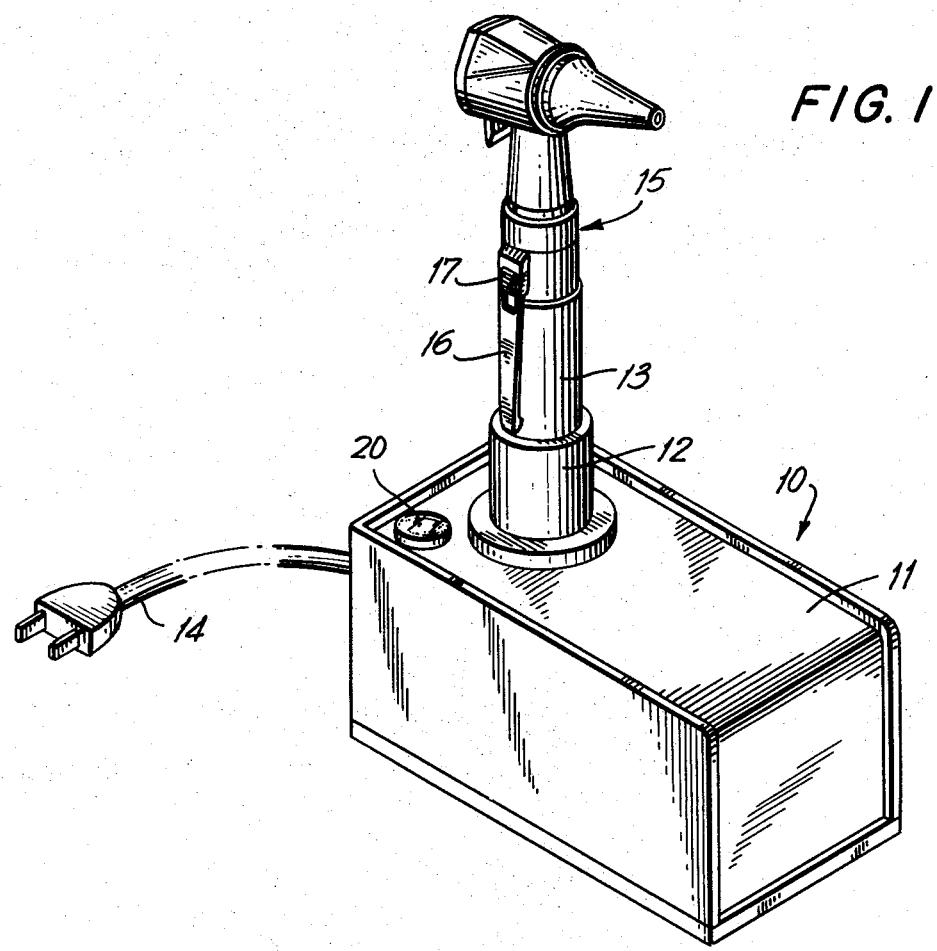
FIG. 1 is a perspective view of a battery-recharging device with an indicating lamp and having an electrical instrument mounted therein.
FIG. 2 is a schematic wiring diagram of electrical circuitry, embodying the invention, as included in a battery-recharging device.

Solely by way of example of an electrical instrument of the type using rechargeable batteries, the invention will be described with reference to a battery-recharging device having an indicating lamp for recharging nickel-cadmium batteries in an otoscope. However, this is solely by way of example, as the principles of the invention are applicable with equal force to the recharging of a rechargeable battery in any type of instrument or appliance.

A typical battery-recharging device 10 is illustrated in FIG. 1 for recharging nickel-cadmium battery cells in an otoscope 15 having a metallic clip 16 carrying an on-off switch 17. When otoscope 15 is inserted into a support in recharging device 10, the terminals of the nickel-cadmium battery are automatically connected to a charging circuit.

The recharging device shown in FIG. 1 includes a casing generally indicated at 11 and preferably constructed of plastic composition material. A tubular element 12, of dielectric material such as a suitable plastic composition material, extends upwardly from casing 11 and serves to mount an electrically conductive support 13 for otoscope 15. When otoscope 15 is inserted into support 13, the opposite terminals of the nickel-cadmium battery in the otoscope engage spring-biased contacts (not shown in FIG. 1), including one such contact at the lower end of support 13 and which is insulated from support 13 to effect connection of the battery to the terminals of the charging circuit. The power supply for recharging device 10 is provided through a three-conductor cord 14 provided with a three-prong plug arranged for plugging into a grounded convenience outlet. As such a cord and plug arrangement are well known to those skilled in the art, they have not been illustrated in more detail in FIG. 1. An indicating lamp 20, preferably provided with a protective lens, is mounted on the upper wall of casing 11 adjacent the tubular element 12.

A battery-recharging device 10, embodying the invention, is shown in the schematic wiring diagram of FIG. 2. The cord 14 includes main conductors 14a and 14b, as well as a grounding conductor 14c. The grounding conductor 14c grounds the device 10 when the three-prong plug on the free end of cord 14 is plugged into a grounded convenience receptable. For this reason, the grounding conductor 14c has been illustrated in broken lines as connected to ground and to a plug prong 18c. Similarly, the conductors 14a and 14b are connected to respective plug prongs 18a and 18b. The conductors 14a and 14b are connected to respective plug prongs 18a and 18b. The conductors 14a and 14b, connected to the plug prongs 18a and 18b, respectively, apply potential to the primary winding 24 of a transformer 25 having a secondary winding 26.

Transformer 25 may be, by way of example, a transformer having 115v at 50 or 60 cycles applied across its primary winding 24, and providing, at its secondary winding, 15v at 60 mA. The terminals of secondary winding 26 are connected by respective conductors 27a and 27b to the input terminals 28a and 28b, respectively, of a rectifier 30. Rectifier 30 has DC output terminals 31a and 31b, and in the particular embodiment of the invention shown in FIG. 2, terminal 31a is a negative output terminal and terminal 31b is a positive output terminal. Thus a pulsating DC voltage of approximately 15v is available at the rectifier output terminals 31a and 31b.

A conductor 32 connects rectifier output terminal 31a to a junction point 33, and a resistor R1 is connected between junction point 33 and a second junction point 34 connected, by a conductor 36, to a metal support 13 for receiving the appliance or instrument whose nickel-cadmium batteries are to be recharged. Positive output terminal 31b is connected by a conductor 37 to a junction point 38, and a conductor 41 connects junction point 38 to a spring-biased contact 35 which is located centrally at the bottom end of the metal support 13. When an appliance or instrument whose nickel-cadmium batteries are to be recharged is inserted into metal support 13, the battery-charging circuit extends from positive terminal 31b of rectifier 30 through conductor 37 to junction point 38 and through conductor 41 to spring-biased contact 35. Spring-biased contact 35 engages one terminal of the battery to be recharged, and the other terminal is electrically connected through metal support 13, to conductor 36 so that the charging circuit then includes junction point 34, resistance R1, junction point 33, conductor 32 and negative terminal 31a of rectifier 30. This charging circuit is closed automatically responsive to insertion of an appliance or instrument into the metal support 13 and into engagement with the spring contact 35 which is electrically isolated from the metal support 13.

In accordance with the invention, an indication of the flow of charging current is provided by a light-emitting device, such as the lamp 20, in association with a solid-state switch means which is illustrated, solely by way of example, as an NPN transistor 40. A resistor R2, serving only as a protective resistor for limiting the base current, connects the base 42 of transistor 40 to the junction point 34, and a conductor 46 connects the emitter 43 of transistor 40 to the junction point 34. A conductor 47 connects collector 44 of transistor 40 to one terminal of lamp 20, and a resistor R3 has one end connected to the other terminal of lamp 20 and its opposite end connected by a conductor 48 to junction point 38. It will thus be noted that the indication circuit, for the flow of charging current, is connected essentially in parallel with the aforementioned battery-recharging circuit.

Resistor R1 constitutes the base-emitter resistor for the transistor 40, and as stated, resistor R2 serve as a protective resistor for limiting the base current. Resistor R3 limits the current flow through lamp 20 to a value less than the rated current flow but adequate to illuminate the lamp 20. For example, if lamp 20 is rated 12v and 35mA, it is operated, through the provision of resistor R3, at 23 to 25mA, resulting in a long life of the lamp. By way of example only, resistor R1 may be a 100-ohm and 0.25W resistor, resistor R2 may be a 2,700-ohm and 0.25W resistor, and resistor R3 may be a 180-ohm and 0.25W resistor. Transistor 20 preferably is a silicon switching transistor, but other solid-state switch means can be used, such as, for example, a PNP transistor, a field effect transistor, a silicon-controlled rectifier, and the like.

The disclosed battery-recharging device, with an indicating lamp, operates in a manner which will now be described. As long as no battery-operated appliance or instrument is inserted into the metal support 13 to contact the spring-biased contact 35, the emitter voltage of transistor 40 is zero and the transistor is blocked or nonconductive, due to the connection of the emitter 43 to the base 42 through the resistor R1. When an appliance or instrument whose batteries are to be recharged is properly inserted into the metal support 13 and engages the spring-biased contact 35, the charging current flows over the previously mentioned battery-charging circuit. There is then a voltage drop across the resistor R1 and, through the resistor R2, there is a difference of potential between base 42 and emitter 43, resulting in flow of current to the base 42 of transistor 40. Transistor 40 thus becomes conductive, and current begins to flow from junction point 33 through conductor 46, emitter 43, collector 44, conductor 47, lamp 20, resistor R3 and conductor 48 to junction point 38. Lamp 20 thus has applied thereto the proper voltage and current for producing illumination of the lamp. Lamp 20 remains illuminated as long as charging current flows. As stated, the flow of current through lamp 20 is limited by the resistor R3 to a value less than the rated current flow for the lamp 20.

Furthermore, resistor R1, which serves not only to produce the control voltage for the base 42 of transistor 40, also serves simultaneously, as a dropping resistor for the battery to be charged, and thus limits the charging current to the proper value of 11–14mA. As the lamp 20 is not connected in series in the charging circuit, failure of the lamp 20 will not affect the charging current. Additionally, failure of lamp 20 to illuminate will indicate that no charging current is flowing through the battery, which might occur when the battery has been discharged below its lower limiting level.

It will thus be seen that the objects set forth above, among those made apparent from the preceding description, are efficiently attained, and since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A battery-recharging device comprising, in combination, support means operable to receive and support a rechargeable electrical battery having a pair of opposite polarity terminals, and including respective contact means engageable with the battery terminals; a source of DC potential for applying a charging potential; a first circuit connected to said source and to said contact means and operable to apply said DC charging potential across a battery then in said support means; a second circuit connected to said DC potential source in parallel with said first circuit and including a normally open switch means serially connected to a light-emitting device and a current limiting resistor, said limiting resistor limiting the current flow through said light emitting device to a value less than the rated current flow thereof but sufficient to effect illumination of said light emitting device, said normally open switch means including a transistor having a base, an emitter and a collector, and switch operating means in said first circuit connected to said normally open switch means and operable to close said normally open switch means, said switch operating means supplying a bias current to the base of said transistor, to trigger said transistor conductive, responsive to flow of battery-charging current in said first circuit.

2. A battery recharging device, as claimed in claim 1, in which said light-emitting device is an indicating lamp connected in series in the emitter-collector circuit of said transistor.

3. A battery-recharging device, as claimed in claim 2, in which said switch operating means comprises a first resistor connected in series in said first circuit and between the emitter and base of said transistor.

4. A battery-recharging device, as claimed in claim 3, in which said first resistor constitutes a dropping resistor limiting the charging current flow in said first circuit.

5. A battery-recharging device, as claimed in claim 3, including a second resistor connected between said first resistor and the base of said transistor.

6. A battery-recharging device, as claimed in claim 3, in which said switch operating means comprises a first resistor connected in series in said first circuit and serving as a dropping resistor to limit the flow of charging current in said first circuit, said first resistor being connected at one end to one terminal of said source in common with the collector-emitter circuit of said transistor, and connected at its opposite end to a junction point in said first circuit; and a second resistor connected between said junction point and the base of said transistor and serving as a base protecting resistor.

7. A battery-recharging device, as claimed in claim 6, in which said source of DC potential comprises a transformer having a primary winding connectable, by a cord and a plug, to a convenience outlet, and a secondary winding; and a rectifier connecting said secondary winding to said first and second circuits.

* * * * *